United States Patent
Yang et al.

(10) Patent No.: US 10,713,026 B2
(45) Date of Patent: Jul. 14, 2020

(54) HETEROGENEOUS DISTRIBUTED RUNTIME CODE THAT SHARES IOT RESOURCES

(71) Applicant: Intel Corporation, Santa Clara, CA (US)

(72) Inventors: Shao-Wen Yang, San Jose, CA (US); Yen-Kuang Chen, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/762,697

(22) PCT Filed: Sep. 25, 2015

(86) PCT No.: PCT/US2015/052387
§ 371 (c)(1),
(2) Date: Mar. 23, 2018

(87) PCT Pub. No.: WO2017/052632
PCT Pub. Date: Mar. 30, 2017

(65) Prior Publication Data
US 2018/0275978 A1    Sep. 27, 2018

(51) Int. Cl.
*G06F 8/60* (2018.01)
*G06F 9/445* (2018.01)
*G06F 8/71* (2018.01)

(52) U.S. Cl.
CPC ............ *G06F 8/60* (2013.01); *G06F 9/44521* (2013.01); *G06F 8/71* (2013.01)

(58) Field of Classification Search
None
See application file for complete search history.

(56) References Cited

U.S. PATENT DOCUMENTS

| 8,055,743 B2* | 11/2011 | Frutiger | H04L 41/0806 709/221 |
| 8,606,877 B2* | 12/2013 | Lind | G06F 9/466 709/217 |
| 2004/0078423 A1* | 4/2004 | Satyavolu | G06Q 10/10 709/203 |
| 2006/0277323 A1* | 12/2006 | Joublin | G06F 8/34 709/248 |

(Continued)

FOREIGN PATENT DOCUMENTS

WO    2014190053 A1    11/2014

OTHER PUBLICATIONS

Kushwaha, "OASiS: A Programming Framework for Service-Oriented Sensor Networks", 2007, IEEE (Year: 2007).*

(Continued)

*Primary Examiner* — Hossain M Morshed
(74) *Attorney, Agent, or Firm* — Jordan IP Law, LLC (57) ABSTRACT

Systems, apparatuses and methods may receive, at a local Internet of Things (IOT) device, a request to deploy an IOT application. Additionally, the IOT application may be partitioned into a plurality of atomic nodes, wherein configuration information for the plurality of atomic nodes may be sent, at runtime, to a plurality of remote IOT devices having abstracted resources that support operation of the first plurality of atomic nodes. In one example, the configuration information is sent via a device independent message protocol having a universal namespace.

24 Claims, 7 Drawing Sheets

(56) References Cited

U.S. PATENT DOCUMENTS

| | | | | |
|---|---|---|---|---|
| 2007/0234430 | A1* | 10/2007 | Goldsmid | G06F 21/125 726/26 |
| 2010/0198955 | A1* | 8/2010 | Maruyama | G06F 8/65 709/223 |
| 2010/0333084 | A1* | 12/2010 | Dehaan | G06F 8/61 717/176 |
| 2013/0219064 | A1 | 8/2013 | Zhang et al. | |
| 2013/0231093 | A1* | 9/2013 | Toy | H04W 4/00 455/414.1 |
| 2014/0122642 | A1 | 5/2014 | Hughes et al. | |
| 2015/0296043 | A1* | 10/2015 | Kim | H04L 67/303 709/203 |
| 2016/0065653 | A1* | 3/2016 | Chen | H04L 67/34 715/735 |
| 2018/0275978 | A1* | 9/2018 | Yang | G06F 8/60 |

OTHER PUBLICATIONS

Apache, "Flume 1.5.2 User Guide", Feb. 1, 2015, Published by Apache at https://flume.apache.org/FlumeUserGuide.html (Year: 2015).*
IBM, "Understanding Resource Abstraction", 2000, Published at https://www.ibm.com/support/knowledgecenter/en/SSLTBW_2.2.0/com.ibm.zos.v2r2.ieai600/abres.htm (Year: 2000).*
IBM OS-390 Release 9, IBM, 1999, IBM Announcement (Year: 1999).*
Kushwala, Publication Title OASiS: A Programming Framework for Service-Oriented Sensor:, 2007, IEEE Networks (Year: 2007).*
IBM, "Understanding Abstract Resouces", 2000, IBM (Year: 2000).*
International Search Report and Written Opinion for International Patent Application No. PCT/US2015/052387, dated Jun. 23, 2016, 10 pages.
Amal Gassara et al., "Towards a Multi-scale Modeling for Architectural Deployment based on Bigraphs", —, 7th European Conference on Software Architecture (ECSA), Montpellier, France, Springer, Jul. 1-5, 2013, vol. 7957, link.springer.com/chapter/10.1007/978-3-642-39031-9-11.
OMG, "Data Distribution Service for Real-time Systems" Jan. 2007, 260 pages, Version 1.2, Object Management Group.
Docker, "Docker Orchestration: Product Brief", 2 pages.
Apache, "HDFS Users Guide", 2008, 10 pages, The Apache Software Foundation.
Oasis, "MQTT Version 3.1.1: Oasis Standard", <docs. oasis-open. org/mqtt/mqtt/v3.1.1. html>, Oct. 29, 2014, 73 pages.
"ROS Graph Concepts", <wiki. ros. org/Messages>, retrieved Sep. 7, 2015, 3 pages.
International Preliminary Report on Patentability for International Patent Application No. PCT/US2015/052387, dated Apr. 5, 2018, 7 pages.
Extended European Search Report for European Patent Application No. 15904965.9, dated Apr. 25, 2019, 9 pages.
Bakshi, Amol et al., "The Abstract Task Graph: A Methodology for Arhitechture-Independent Programming of Networked Sensor Systems," EESR 05: Workshop on End-to-End, Sense-and-Respond, USENIX Association, Jun. 5, 2005, pp. 19-24, Berkley, CA.
Persson, Per et al., "Calvin—Merging Cloud and IoT," Procedia Computer Science vol. 52, Jun. 3, 2015, pp. 210-217, Amsterdam, NL.
Nastic, Stefan et al., "Provisioning Software-Defined IoT Cloud Systems," 2014 International Conference on Future Internet of Things and Cloud, IEEE, Aug. 27, 2014, pp. 288-295.
Blackstock, Michael et al., "Toward a Distributed Data Flow Platform for the Web of Things (Distributed Node-RED)," Oct. 8, 2014, pp. 34-39, New York, NY.

* cited by examiner

HETEROGENEOUS DISTRIBUTED RUNTIME CODE THAT SHARES IOT RESOURCES

CROSS REFERENCE TO RELATED APPLICATIONS

This application is a U.S. National Phase Patent Application which claims benefit to International Patent Application No. PCT/US2015/052387 filed on Sep. 25, 2015.

TECHNICAL FIELD

Embodiments generally relate to the Internet of Things (IOT). More particularly, embodiments relate to heterogeneous distributed runtime code that shares IOT resources.

BACKGROUND

Internet of Things (IOT) solutions may enable household devices such as thermostats, washers/dryers, and so forth, to interactively report operational data to homeowners, utility companies and other analytical services. The IOT devices may have fixed roles of either master or slave, with master devices acting as entry points to the IOT service in question. The fixed master-slave model, however, may have a negative impact on scalability. Additionally, certain IOT devices may be designated as global coordinators that manage tasks, namespaces, etc., wherein the global coordinators may represent single points of failure that reduce the resiliency of the overall network. Conventional IOT solutions may also treat the underlying devices as homogeneous components (e.g., each having memory and a central processing unit/CPU), although the devices may in fact be heterogeneous with a diverse set of resources. Moreover, deployment of a typical IOT application may involve installation of a complete copy of the application on each of the IOT devices. Such an approach may incur substantial costs of distribution and may be impractical for certain devices having limited resources.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
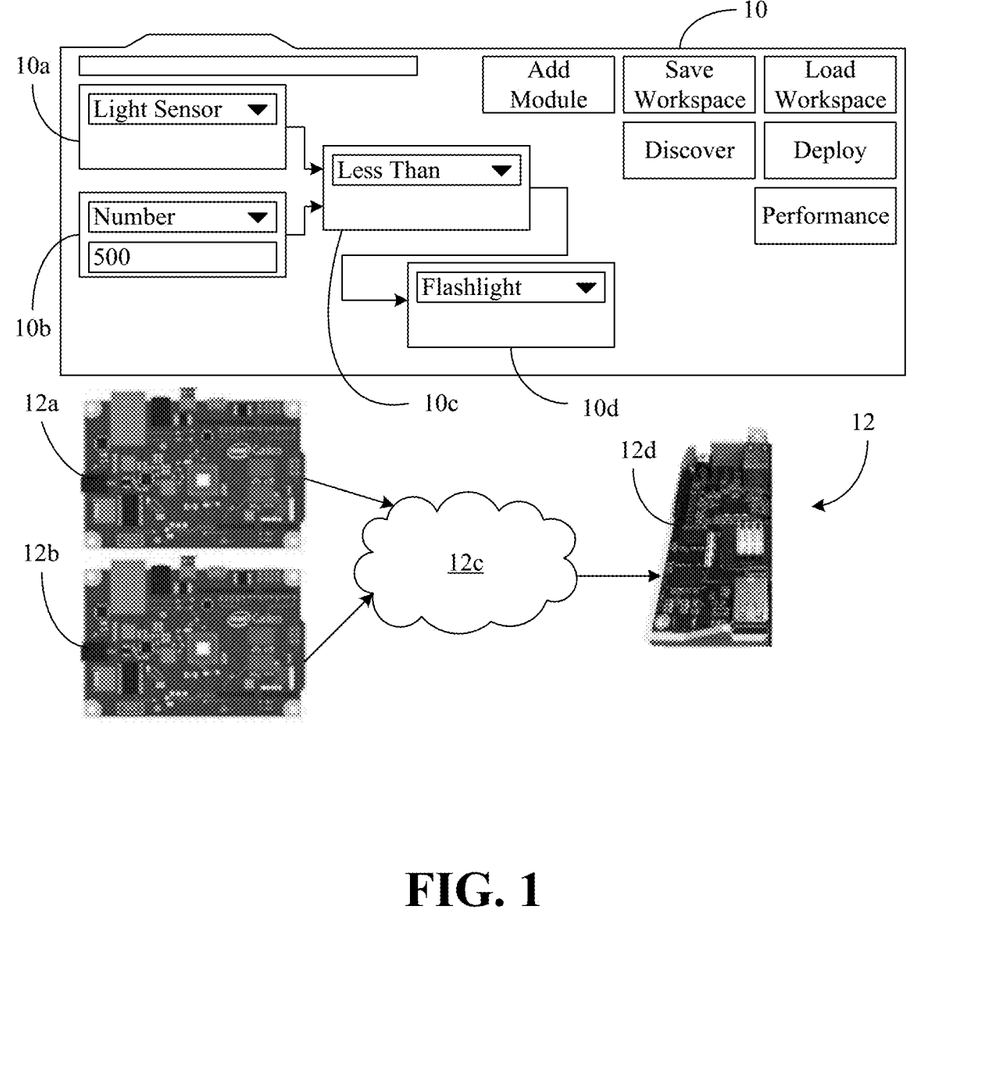
FIG. 1 is an illustration of an example of a frontend interface and IOT architecture according to an embodiment.

Turning now to FIG. 1, a frontend interface 10 (10a-10d) is shown, wherein the frontend interface 10 may be used by a developer to create and deploy an application such as, for example, an Internet of Things (IOT) application. The frontend interface 10 may therefore present a virtualization of a physical IOT architecture 12 (12a-12d) that may be used to support operation of the IOT application designed using the frontend interface 10. The IOT architecture 12 may generally include devices such as, for example, IOT devices having physical resources that support operation of the IOT application being deployed via the frontend interface 10. Each IOT device in the architecture 12 may function as a "coordinator" (e.g., master) with regard to some IOT applications and function solely as a "contributor" (e.g., slave) with regard to other IOT applications. Thus, the frontend interface 10 may run on a coordinator IOT device that deploys the IOT application in question to other contributor IOT devices.

In the illustrated example, both a light sensing resource abstraction 10a and a storage resource abstraction 10b provide inputs to a compute resource abstraction 10c. The compute resource abstraction 10c may perform a computation (e.g., determine whether the light sensing input is less than the value 500) and send the result of the computation to a flashlight resource abstraction 10d (e.g., turning on a flashlight if the light sensing input is less than the value 500). One or more resources in the illustrated IOT architecture 12 may generally correspond to the resource abstractions in the frontend interface 10. For example, a light sensor circuit 12a corresponds to the light sensing resource abstraction 10a, a storage circuit 12b corresponds to the storage resource abstraction 10b, a cloud computing infrastructure 12c corresponds to the compute resource abstraction 10c, and a flashlight circuit 12d corresponds to the flashlight resource abstraction 10d, in the illustrated example.

Of particular note is that the frontend interface 10 may enable the IOT application to be developed without the use of identifiers, addresses (e.g., media access control/MAC addresses), etc., of the contributors. The coordinator IOT device (e.g., gateway, cloud manager) may subsequently determine the bindings (e.g., assignments) between resource requirements and the contributors, and conduct the deployment. As will be discussed in greater detail, the coordinator IOT device may partition the IOT application into a plurality of atomic nodes and deploy configuration information for the atomic nodes to the contributors. The configuration information may be the minimal set of settings that enable the contributors to generate runtime code. Thus, once the configuration information is deployed, the contributors may execute their respective portion of the IOT application and communicate with one another to accomplish the tasks of the IOT application.

Figure 2A:
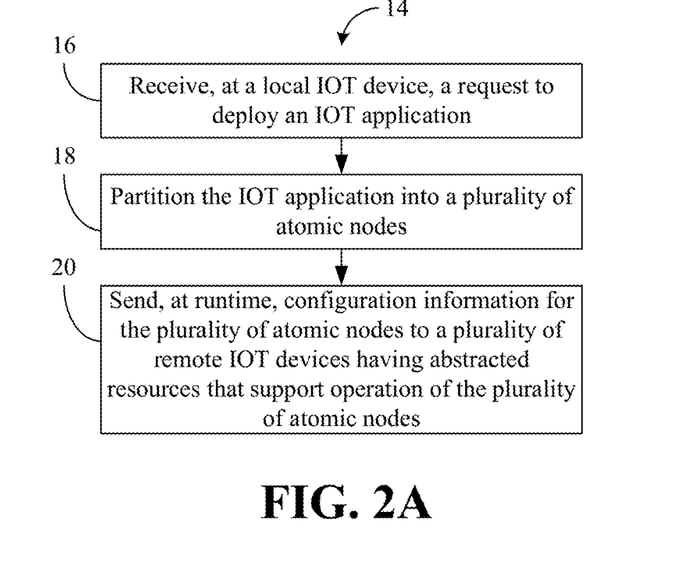
FIG. 2A is a flowchart of an example of a method of operating a coordinator apparatus according to an embodiment.

FIG. 2A shows a method 14 of operating a coordinator apparatus of an IOT device. The method 14 may be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 14 may be written in any combination of one or more programming languages, including an object oriented programming language such as JAVA, SMALLTALK, C++ or the like and conventional procedural programming languages, such as the "C" programming language or similar programming languages.

Illustrated processing block 16 provides for receiving, at a local IOT device, a request to deploy an IOT application. The request may be received via a frontend interface such as, for example, the frontend interface 10 (FIG. 1), already discussed. The IOT application may be partitioned at block 18 into a plurality of atomic nodes. The atomic nodes may be classified as, for example, source nodes that generate data, sink nodes that consume data and/or operator nodes that consume data and generate data.

Block 20 may send, at runtime, configuration information for the plurality of atomic nodes to a plurality of remote IOT devices having abstracted resources that support operation of the plurality of atomic nodes. As already noted, the configuration information may be the minimal set of settings that enable the contributors to generate runtime code. Thus, the configuration information, which may be sent via a device independent messaging protocol, may include a class identifier and one or more parameters associated with each atomic node. In one example, the class identifiers include one or more of a source node class, a sink node class or an operator class. Accordingly, block 20 may also provide for instructing each of the plurality of remote IOT devices to conduct a runtime generation of only a subset of the first plurality of atomic nodes. There may also be one or more local abstracted resources that can support operation of a portion of the IOT application. In such a case, block 20 may also bind one or more local abstracted resources to a subset of the plurality of atomic nodes.

Figure 2B:
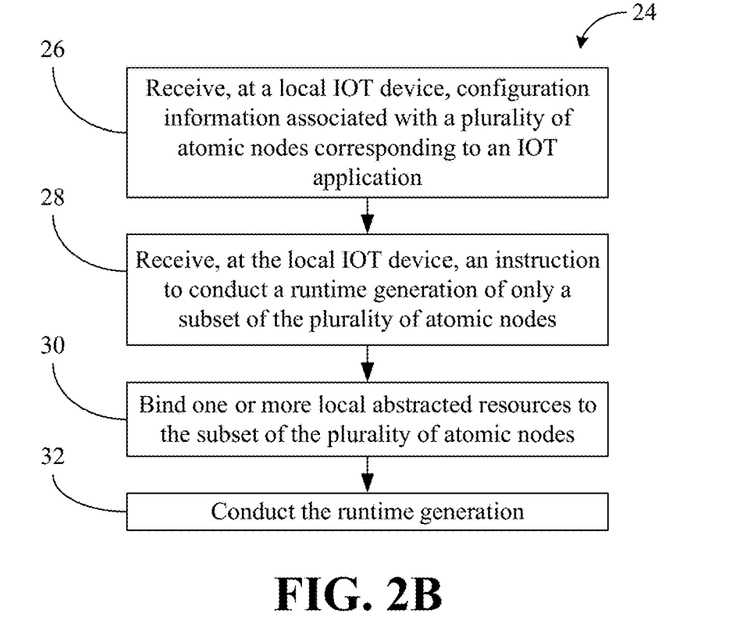
FIG. 2B is a flowchart of an example of a method of operating an IOT device according to an embodiment.

FIG. 2B shows a method of operating an IOT device that is functioning as a contributor or a profile adaptor (described in greater detail below). The method 24 may be implemented as one or more modules in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 26 provides for receiving, at the IOT device, configuration information associated with a plurality of atomic nodes corresponding to an IOT application. Additionally, block 28 may receive, at the IOT device, an instruction to conduct a runtime generation of only a subset of the plurality of atomic nodes. One or more local abstracted resources may be bound to the subset of the plurality of atomic nodes at block 30. Additionally, illustrated block 32 conducts the runtime generation.

Figure 3:
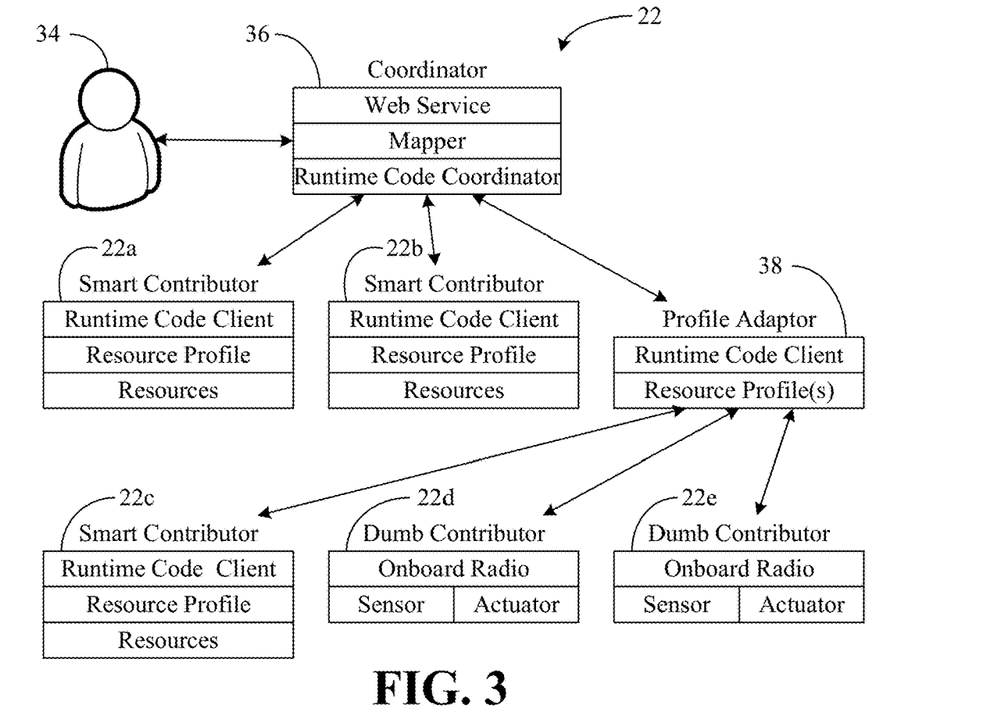
FIG. 3 is a block diagram of an example of a plurality of contributors according to an embodiment.

Turning now to FIG. 3, a plurality of contributors 22 (22a-22e) is shown. In the illustrated example, a developer 34 interacts with a coordinator 36 (e.g., coordinator IOT device), which includes a web service, a mapper and a runtime code (e.g., "rule engine") coordinator. The web service may facilitate online access to the coordinator 36 and the mapper may determine which abstracted resources of the contributors 22 will support which operations of the IOT application in question. Additionally, the runtime code coordinator may instruct the contributors 22 with regard to runtime code regeneration. The coordinator 36 may also function as a contributor to the extent that it has local abstracted resources that support operation of the IOT application.

In the illustrated example, "smart" contributors 22a and 22b include runtime code clients, resource profiles and resources, and may therefore regenerate runtime code without involving a profile adaptor 38. By contrast, "dumb" contributors 22d and 22e may merely contain an onboard radio, sensor and/or actuator. Thus, the coordinator 36 may communicate with the dumb contributors 22d and 22e via the profile adaptor 38, which includes a runtime code client and resource profiles for the dumb contributors 22d, 22e. The coordinator 36 may also communicate with a smart contributor 22c via the profile adaptor 38.

Resource Abstraction:

As already noted, the resources of the IOT devices may be abstracted (described generally to exclude device identifiers) until runtime. Such an approach may facilitate development by determining which device identifiers to be used at runtime. More particularly, resource abstraction may enhance ease-of-use by enabling the development of IOT applications without hardcoded identifiers (e.g., increasing portability of IOT applications). Resource abstraction may also expedite the development of IOT applications by disregarding radio protocols and network topologies at the requirement specification stage. In one example, the resource abstractions may include abstractions such as, for example, sensing (e.g., light, presence, temperature, etc.), actuation (e.g., light, sunshade, air conditioning, etc.), power (e.g., battery-powered, landline powered, etc.), storage (e.g., secure digital/SD, solid state disk/SSD, cloud storage, etc.), computing (e.g., microcontroller unit/MCU, central processing unit/CPU, graphics processing unit/GPU, cloud, etc.), communication (e.g., Bluetooth Low Energy/BLE, ZIG-BEE, WiFi, Ethernet, etc.), and so forth.

In one example, the coordinator may discover sensing, actuation and communication resources via the device independent message protocol, and protocol adaptation may be used to obtain the power, storage and computing abstractions from the operating system (OS).

Figure 4:
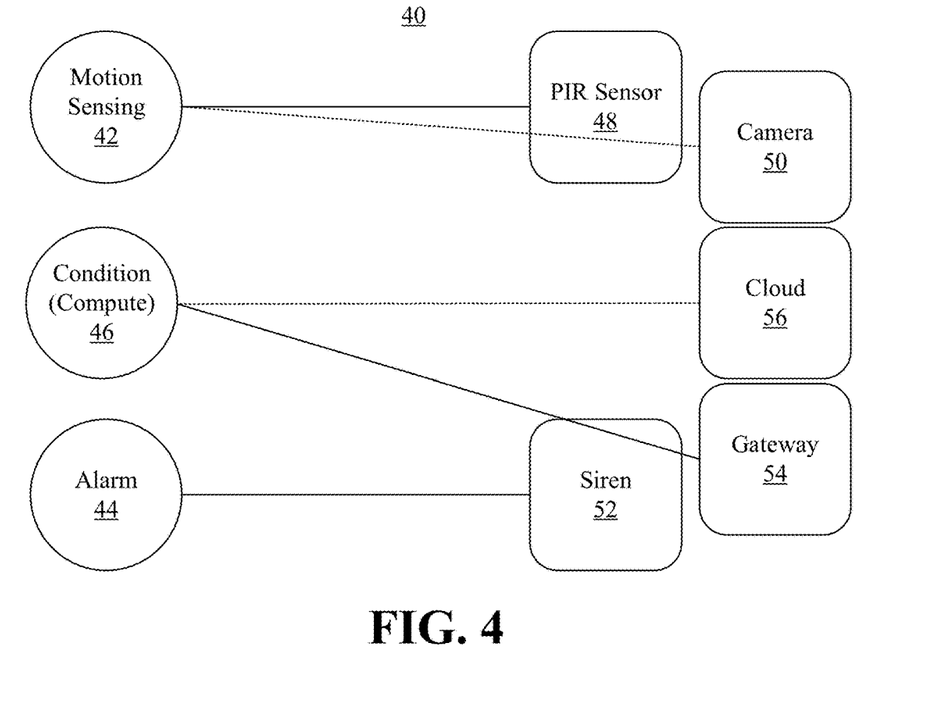
FIG. 4 is a block diagram of an example of a resource binding according to an embodiment.

Resource/Asset Binding:

Resource binding may be modeled as a bipartite matching (or assignment) problem in which the bipartite graph can be expressed by G=(R,A,E) where R denotes the asset requirements, A denotes the available assets and e=(r,a) in E where a in A is capable of r in R. Note that if R requests for n instances of a particular asset, we can simply define A' as, $$\frac{UA}{n}$$

and then solve the (maximum) (weighted) matching problem.

FIG. 4 shows a resource binding 40 in which the resources requested by an application are a motion sensing abstraction 42, an alarm abstraction 44 and a compute abstraction 46. The available resources are a passive infrared (PIR) sensor 48, a camera 50, a siren 52, a gateway 54 and the cloud 56. The bipartite graph is shown with both solid and dashed lines, wherein alternative matchings are shown in dashed lines. An exhaustive search may be used as the number of vertices in the bipartite graph is relatively low and the edges are constrained in the sense that there is an edge (r,a) only if a is capable of r.

Distributed Runtime Code (e.g., Rule Engine):

The distributed runtime code may be considered transformative in the sense that the generated code may be partitioned and distributed to multiple devices as-is. It also allows the generated code to be partitioned in whatever form that is optimized for any objectives. The distributed runtime code is homogeneous in the sense that every device may serve as both master (e.g., entry of service) and slave (e.g., support to a service) in a per application manner. Of particular note is that device independent communication may be used to distribute configuration information for the runtime code.

Atomic Nodes:

The atomic software components of an IOT application may be classified into categories such as, for example, the following three categories.

1. Source nodes that generate data. A source node may not take input from other nodes and generate one data stream, which can be sent to multiple succeeding nodes. In one example, source nodes use application programming interfaces (APIs) such as, for example, GPIO (General Purpose Input/Output), RESTful (Representational State Transfer), etc., to obtain the data and then send the data to the successor(s) of the source nodes.

2. Sink nodes that consume data. A sink node may not have a successor and may accept as input an arbitrary number of nodes. Sink nodes may also use APIs such as, for example, GPIO, RESTful, etc., to trigger control of hardware or software.

3. Operator nodes that consume data and generate data. An operator node may accept an arbitrary number of inputs and generate one output stream, which may be sent to multiple succeeding nodes. Operator nodes may include mathematical and/or analytical functions such as, for example, thresholding (e.g., less than), average, and so forth. Other atomic node classifications may also be used.

Figure 5:
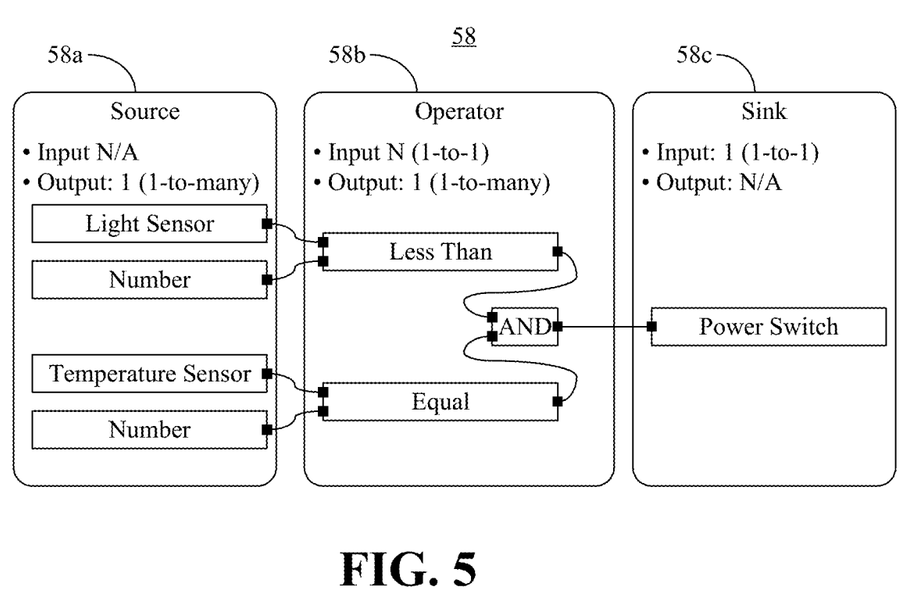
FIG. 5 is a block diagram of an example of a plurality of atomic nodes according to an embodiment.

FIG. 5 shows a plurality of atomic nodes 58 (58a-58c). In the illustrated a source node 58a generates a light sensor output and associated number, as well as a temperature sensor output and associated number. An operator node 58b may apply a first function (e.g., less than) to the light sensor output and associated number, wherein the first function has an output that feeds into an AND function. Similarly, the operator node 58b may apply a second function (e.g., equal) to the temperature sensor output and associated number, wherein the second function also has an output that feeds into the AND function. The illustrated AND function is coupled to an input of a sink node 58c, which includes a power switch actuator.

Device Independent Messaging:

Configuration information for the atomic nodes may be redistributed in the runtime. A device independent message protocol may use a universal name space (which may be confined to a per user basis), to differentiate runtime resources from one another, independent of the underlying physical devices. In one example, a JAVA virtual machine (JVM) performs runtime rule execution. Given device independent messaging, code may be retained as-is while reconfiguring the system, and, as a result, code generation may be performed by the coordinator only once when the IOT application is deployed. The deployed JAVA bytecodes may be portable.

The atomic nodes may be deployed to physical devices at runtime. The device independent message protocol may have a universal namespace. The namespace may be considered universal to the extent that it is unique on a per device, per service basis. The uniqueness may ensure that configuration deployments are conflict free. In one example, the namespace is defined as:

/<applicationId>/<deviceId>/<assetId> where applicationId is a unique string created in the runtime by the coordinator, deviceId is the identity of the IOT device managed by the coordinator, and assetId is the identifier of the asset/resource provided by the protocol adaptation layer (e.g., Open Interconnect Consortium/OIC).

Figure 6:
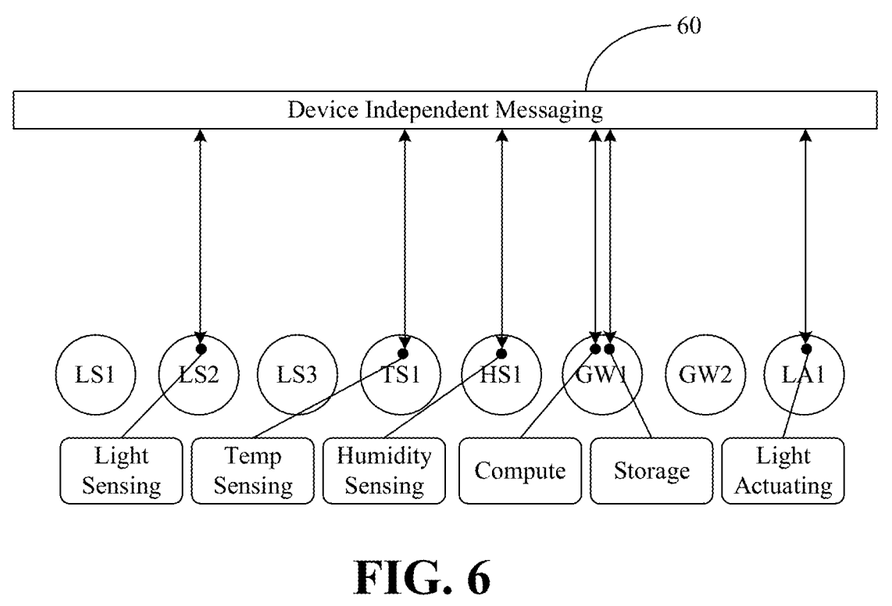
FIG. 6 is a block diagram of an example of a device independent message protocol according to an embodiment.

As illustrated in FIG. 6, given that a device independent message protocol 60 is realized by a universal namespace, the runtime code may no longer be dependent on where IOT devices are physically deployed. As a result, atomic nodes may be moved/shifted at the time of deployment time and at runtime, independent of which physical device runs the atomic node in question. In the illustrated example, LS refers to a light sensor, TS refers to a temperature sensor, HS refers to a humidity sensor, GW refers to a gateway and LA refers to a light actuator.

In one example, the device independent message protocol 60 may be implemented via, for example, MQTT (message queue telemetry transport), ROS (robot operating system), DDS (Data Distribution Service), and/or any other suitable publisher-subscriber messaging software. Note that to eliminate single points of failure in the messaging namespace, MQTT clusters or simply DDS (e.g., a no-broker publisher-subscriber implementation) may be used. Simply put, atomic nodes, device independent messaging and resource abstraction may enable configuration information for runtime code to be distributed across multiple devices without hardcoding device identifiers at development time.

Figure 7:
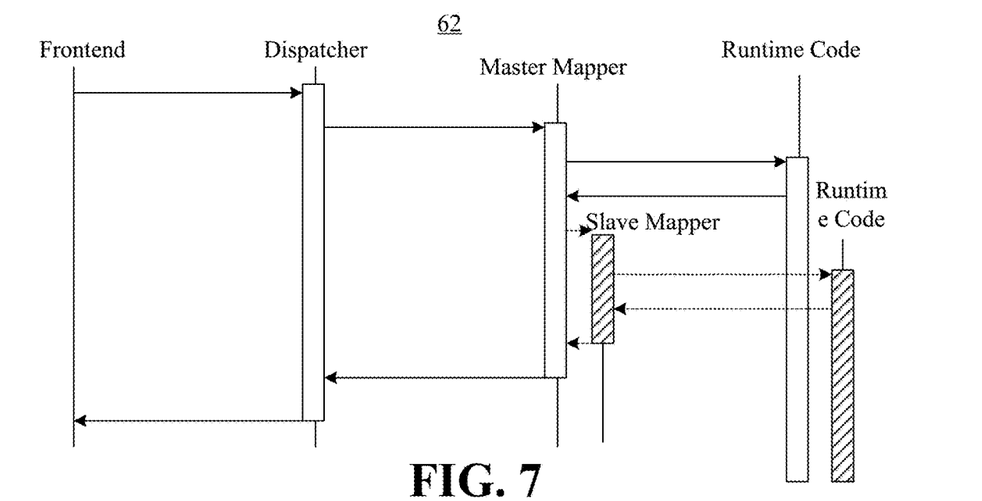
FIG. 7 is a block diagram of an example of a deployment of an IOT application according to an embodiment.
Figure 8:
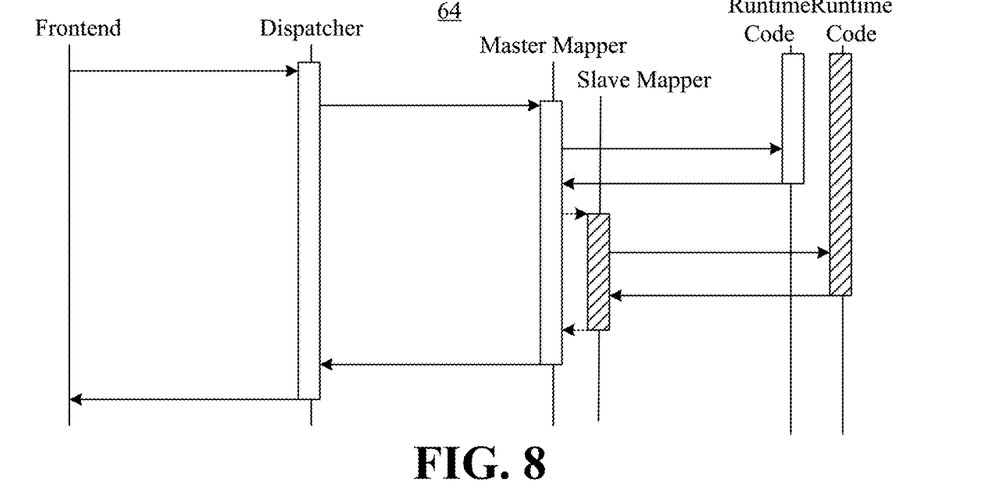
FIG. 8 is a block diagram of an example of an undeployment of an IOT application according to an embodiment.

Resource Coordination:

As already noted, resources may be coordinated between devices using device independent messaging. At the outset, statuses of devices may be broadcasted with a keep alive channel. An API may be provided for devices to discover resources between one another. Resource coordination design is illustrated in FIGS. 7 and 8, for deployment 62 and undeployment 64, respectively. Example pseudocode is shown below, where deploy ("localhost", R, TRUE) is the initial location on the deploying device.

```
function deploy (host h, asset requirements R, master b):
    Asset A := { }
    Asset X := { }
    Discover available devices D
    if b is TRUE: // namely, if the device initiates deploy
        for d in D:
            Discover assets B of d
            for a in B:
                Add (d,a) to A
    Perform bipartite matching M between R and A
    for m = (r,(d,a)) in M:
        if d is nil:
            return FALSE
        if d is remote:
            Add d to X
    for d in X:
        s = deploy(d, R, FALSE)
        if s is FALSE:
            return FALSE
    for m = (r,(d,a)) in M:
        if d is local:
            deploy r to a
    return TRUE
```

Every device may serve as the entry point of service for users to deploy an IOT application. Thus, any device may negotiate and coordinate assets/resources if local assets are insufficient or for optimization purposes. The coordinator IOT device (e.g., master mapper in FIGS. 7 and 8) may receive the resource requirements from the user and automatically perform the following.

1. Discover remote resources, e.g., nearby gateways, cloud, etc.
2. Perform mapping between resource requirements and the available resources
3. Deploy locally bound resources
4. Send resource requirements to remote devices Additionally, the contributor IOT devices (e.g., slave mapper in FIGS. 7 and 8) may receive asset requirements from a coordinator device and automatically perform the following.

1. Deploy Locally Bound Resources

In FIGS. 7 and 8, the master mapper and the slave mapper are defined on a per application basis. Simply put, it is possible for an IOT device to serve as the master mapper for one application and as the slave mapper for another application at the same time.

The above pseudocode may be implemented in, for example, JAVA using MQTT for cross-device communication and code distribution. Moreover, only the configuration information of an application may be sent among devices. Runtime code may be generated on the fly and only for failover responsiveness in order to reduce bandwidth and optimize memory footprint. A complete copy of the configuration information may be sent to all deployed devices for better availability.

Figure 9:
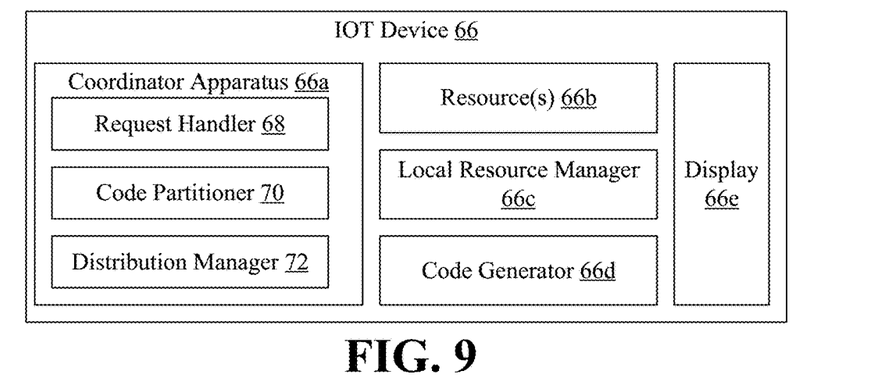
FIG. 9 is a block diagram of an example of an IOT device according to an embodiment.

Turning now to FIG. 9, an IOT device 66 (66a-66e, e.g., light sensor temperature sensor, humidity sensor, gateway, light actuator) is shown. The IOT device 66 may generally perform one or more aspects of the method 14 (FIG. 2A) and/or the method 24 (FIG. 2B). Thus, the IOT device 66 may include logic instructions, configurable logic, fixed-functionality logic hardware, etc., or any combination thereof. The IOT device 66 may include a coordinator apparatus 66a having a request handler 68 to receive (e.g., in coordinator/master mode), at the IOT device 66, a request to deploy a first IOT application. The coordinator apparatus 66a may also include a code partitioner 70 to partition the first IOT application into a first plurality of atomic nodes and a distribution manager 72 to send, at runtime, first configuration information for the first plurality of atomic nodes to a plurality of remote IOT devices having abstracted resources that support operation of the first plurality of atomic nodes.

The first configuration information may be sent via a device independent message protocol having a universal namespace. Moreover, the first configuration information may include a class identifier and one or more parameters associated with each atomic node, wherein the class identifier may include one or more of a source node class, a sink node class or an operator node class. In one example, the distribution manager 72 instructs each of the plurality of remote IOT devices to conduct a runtime generation of only a subset of the first plurality of atomic nodes (e.g., each remote IOT device only generates the runtime code for which it is responsible).

The illustrated IOT device 66 also includes one or more local abstracted resources 66b (e.g., light sensing, temperature sensing, humidity sensing, compute, storage, light actuating) and a local resource manager 66c to bind at least one of the one or more local abstracted resources to a subset of the first plurality of atomic nodes.

The request handler 68 may also receive (e.g., in contributor/slave mode), at the IOT device 66, second configuration information associated with a second plurality of atomic nodes corresponding to a second IOT application. In addition, the request handler 68 may receive an instruction to conduct a second runtime generation of only a subset of the second plurality of atomic nodes. In such a case, the local resource manager 66c may bind one or more of the local abstracted resources 66b to the subset of the second plurality of atomic nodes. Moreover, a code generator 66d may conduct the second runtime generation.

The illustrated IOT device 66 also includes a display 66e to present a frontend interface such as, for example, the frontend interface 10 (FIG. 1), already discussed. Accordingly, the request handler 68 may receive requests via the frontend interface.

Figure 10:
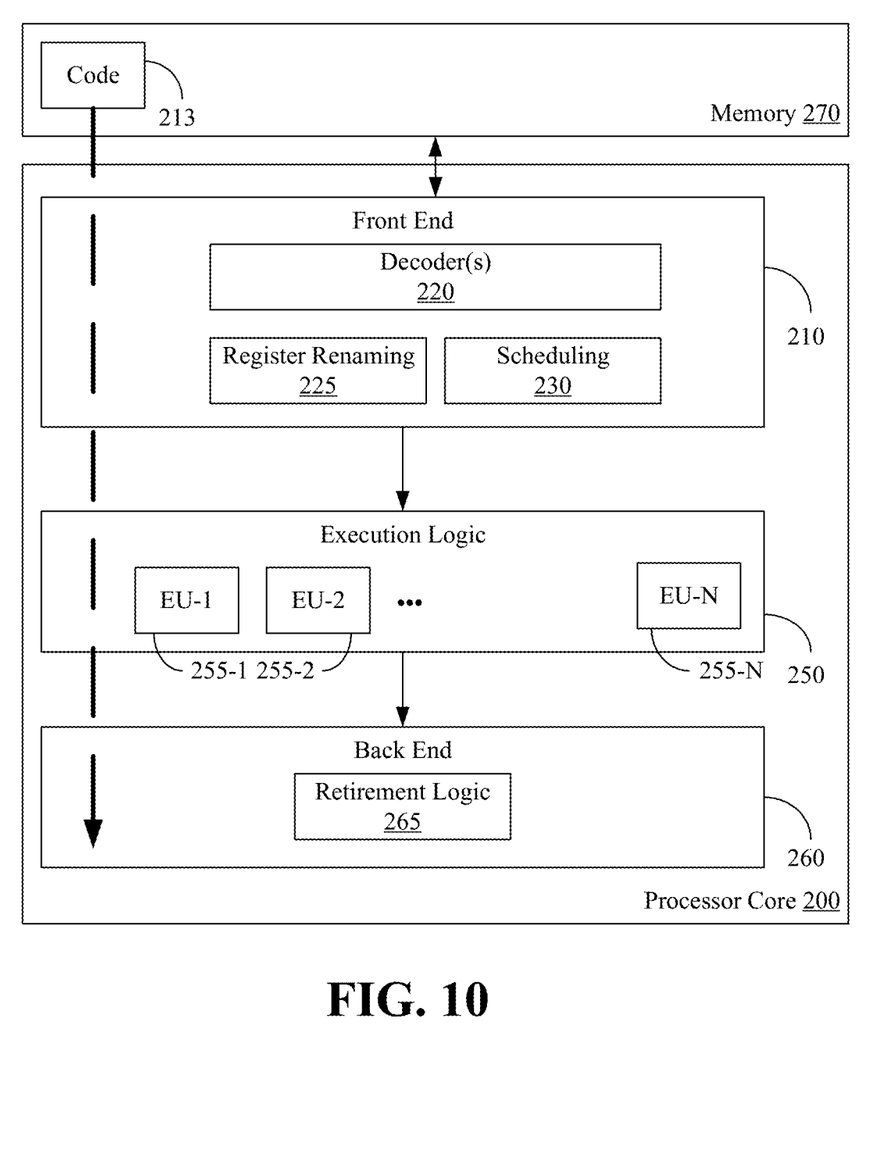
FIG. 10 is a block diagram of an example of a processor according to an embodiment.

FIG. 10 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 10, a processing element may alternatively include more than one of the processor core 200 illustrated in FIG. 10. The processor core 200 may be a single-threaded core or, for at least one embodiment, the processor core 200 may be multithreaded in that it may include more than one hardware thread context (or "logical processor") per core.

FIG. 10 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 14 (FIG. 2) and/or the method 24 (FIG. 3), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 10, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 11:
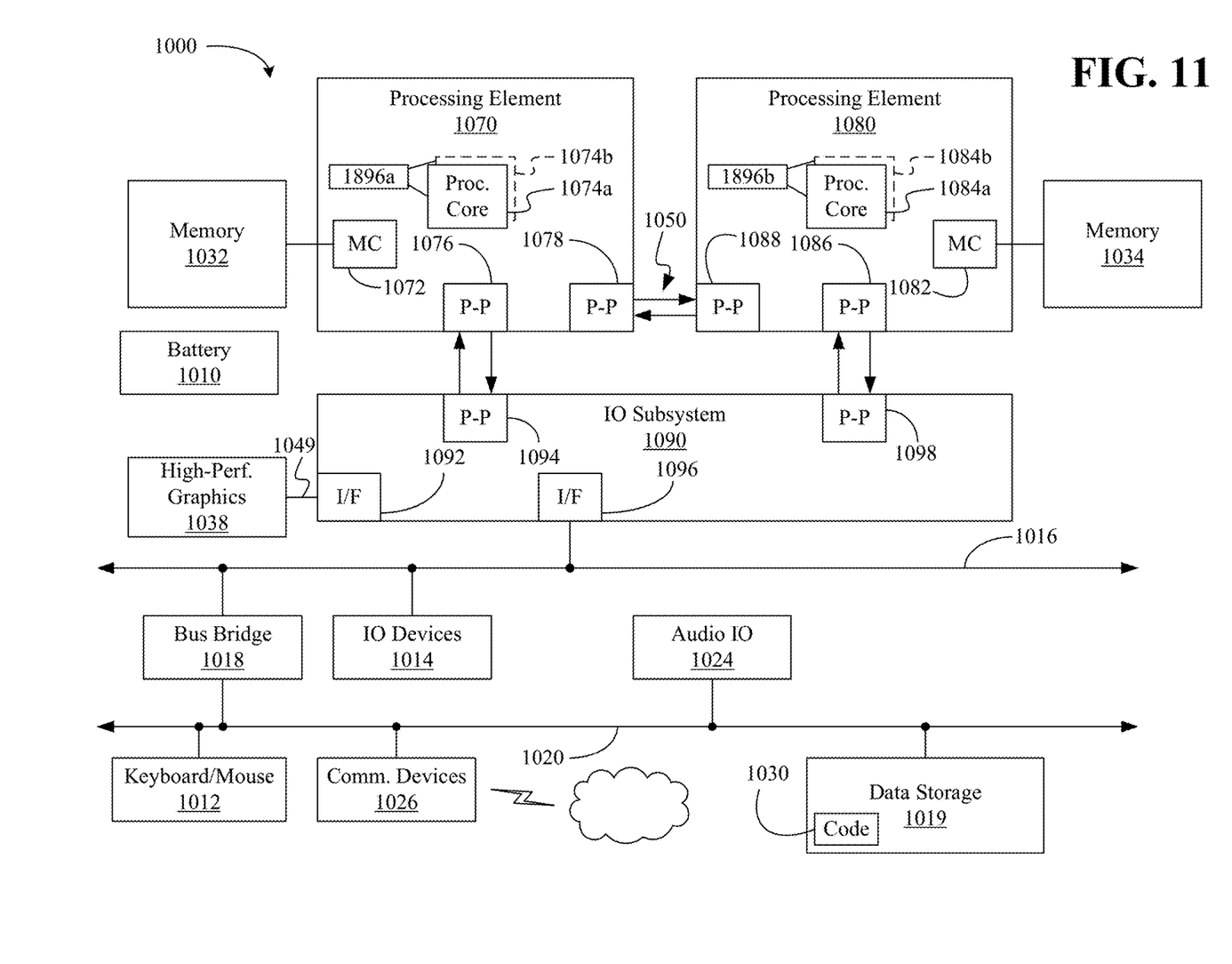
FIG. 11 is a block diagram of an example of a computing system according to an embodiment.

Referring now to FIG. 11, shown is a block diagram of a computing system 1000 embodiment in accordance with an embodiment. Shown in FIG. 11 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 11 may be implemented as a multi-drop bus rather than point-to-point interconnect.

As shown in FIG. 11, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 10.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 11, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 11, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 11, various I/O devices 1014 (e.g., speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 14 (FIG. 2) and/or the method 24 (FIG. 3), already discussed, and may be similar to the code 213 (FIG. 10), already discussed. The system 1000 may also include a coordinator apparatus such as, for example, the coordinator apparatus 66a (FIG. 9). Further, an audio I/O 1024 may be coupled to second bus 1020 and a battery 1010 may supply power to the computing system 1000.

Note that other embodiments are contemplated. For example, instead of the point-to-point architecture of FIG. 11, a system may implement a multi-drop bus or another such communication topology. Also, the elements of FIG. 11 may alternatively be partitioned using more or fewer integrated chips than shown in FIG. 11.

Additional Notes and Examples

Example 1 may include a local device comprising a display to present a frontend interface comprising a display to present a frontend interface and a coordinator apparatus including a request handler to receive, via the frontend interface, a request to deploy a first application, a code partitioner to partition the first application into a first plurality of atomic nodes, and a distribution manager to send, at runtime, first configuration information for the first plurality of atomic nodes to a plurality of remote devices having abstracted resources that support operation of the first plurality of atomic nodes.

Example 2 may include the local device of Example 1, wherein the first configuration information is to be sent via a device independent message protocol having a universal namespace.

Example 3 may include the local device of Example 1, wherein the distribution manager is to instruct each of the plurality of remote devices to conduct a runtime generation of only a subset of the first plurality of atomic nodes.

Example 4 may include the local device of Example 1, wherein the first configuration information is to include a class identifier and one or more parameters associated with each atomic node, and wherein the class identifier includes one or more of a source node class, a sink node class or an operator node class.

Example 5 may include the local device of Example 1, further including one or more local abstracted resources, and a local resource manager to bind the one or more local abstracted resources to a subset of the first plurality of atomic nodes.

Example 6 may include the local device of any one of Examples 1 to 5, wherein the request handler is to receive, at the local device, second configuration information associated with a second plurality of atomic nodes corresponding to a second application and an instruction to conduct a second runtime generation of only a subset of the second plurality of atomic nodes, and wherein the coordinator apparatus further includes a local resource manager to bind one or more local abstracted resources to the subset of the second plurality of atomic nodes, and a code generator to conduct the second runtime generation.

Example 7 may include a coordinator apparatus comprising a request handler to receive, at a local device, a request to deploy a first application, a code partitioner to partition the first application into a first plurality of atomic nodes, and a distribution manager to send, at runtime, first configuration information for the first plurality of atomic nodes to a plurality of remote devices having abstracted resources that support operation of the first plurality of atomic nodes.

Example 8 may include the apparatus of Example 7, wherein the first configuration information is to be sent via a device independent message protocol having a universal namespace.

Example 9 may include the apparatus of Example 7, wherein the distribution manager is to instruct each of the plurality of remote devices to conduct a runtime generation of only a subset of the first plurality of atomic nodes.

Example 10 may include the apparatus of Example 7, wherein the first configuration information is to include a class identifier and one or more parameters associated with each atomic node, and wherein the class identifier includes one or more of a source node class, a sink node class or an operator node class.

Example 11 may include the apparatus of Example 7, further including one or more local abstracted resources, and a local resource manager to bind the one or more local abstracted resources to a subset of the first plurality of atomic nodes.

Example 12 may include the apparatus of any one of Examples 7 to 11, wherein the request handler is to receive, at the local device, second configuration information associated with a second plurality of atomic nodes corresponding to a second application and an instruction to conduct a second runtime generation of only a subset of the second plurality of atomic nodes, and wherein the apparatus further includes a local resource manager to bind one or more local abstracted resources to the subset of the second plurality of atomic nodes, and a code generator to conduct the second runtime generation.

Example 13 may include a method of operating a coordinator apparatus comprising receiving, at a local device, a request to deploy a first application, partitioning the first application into a first plurality of atomic nodes, and sending, at runtime, first configuration information for the first plurality of atomic nodes to a plurality of remote devices having abstracted resources that support operation of the first plurality of atomic nodes.

Example 14 may include the method of Example 13, wherein the first configuration information is sent via a device independent message protocol having a universal namespace.

Example 15 may include the method of Example 13, further including instructing each of the plurality of remote devices to conduct a runtime generation of only a subset of the first plurality of atomic nodes.

Example 16 may include the method of Example 13, wherein the first configuration information includes a class identifier and one or more parameters associated with each atomic node, and wherein the class identifier includes one or more of a source node class, a sink node class or an operator node class.

Example 17 may include the method of Example 13, further including binding one or more local abstracted resources to a subset of the first plurality of atomic nodes Example 18 may include the method of any one of Examples 13 to 17, further including receiving, at the local device, second configuration information associated with a second plurality of atomic nodes corresponding to a second application, receiving, at the local device, an instruction to conduct a second runtime generation of only a subset of the second plurality of atomic nodes, binding one or more local abstracted resources to the subset of the second plurality of atomic nodes, and conducting the second runtime generation.

Example 19 may include at least one non-transitory computer readable storage medium comprising a set of instructions, which when executed by a local device, cause the local device to receive, at the local device, a request to deploy a first application, partition the first application into a first plurality of atomic nodes, and send, at runtime, first configuration information for the first plurality of atomic nodes to a plurality of remote devices having abstracted resources that support operation of the first plurality of atomic nodes.

Example 20 may include the at least one non-transitory computer readable storage medium of Example 19, wherein the first configuration information is to be sent via a device independent message protocol having a universal namespace.

Example 21 may include the at least one non-transitory computer readable storage medium of Example 19, wherein the instructions, when executed, cause the local device to instruct each of the plurality of remote devices to conduct a runtime generation of only a subset of the first plurality of atomic nodes.

Example 22 may include the at least one non-transitory computer readable storage medium of Example 19, wherein the first configuration information is to include a class identifier and one or more parameters associated with each atomic node, and wherein the class identifier includes one or more of a source node class, a sink node class or an operator node class.

Example 23 may include the at least one non-transitory computer readable storage medium of Example 19, wherein the instructions, when executed, cause the local device to bind one or more local abstracted resources to a subset of the first plurality of atomic nodes.

Example 24 may include the at least one non-transitory computer readable storage medium of any one of Examples 19 to 23, wherein the instructions, when executed, cause the local device to receive, at the local device, second configuration information associated with a second plurality of atomic nodes corresponding to a second application, receive, at the local device, an instruction to conduct a second runtime generation of only a subset of the second plurality of atomic nodes, bind one or more local abstracted resources to the subset of the second plurality of atomic nodes, and conduct the second runtime generation.

Example 25 may include a coordinator apparatus comprising means for receiving, at a local device, a request to deploy a first application, means for partitioning the first application into a first plurality of atomic nodes, and means for sending, at runtime, first configuration information for the first plurality of atomic nodes to a plurality of remote devices having abstracted resources that support operation of the first plurality of atomic nodes.

Example 26 may include the apparatus of Example 25, wherein the first configuration information is to be sent via a device independent message protocol having a universal namespace.

Example 27 may include the apparatus of Example 25, further including means for instructing each of the plurality of remote devices to conduct a runtime generation of only a subset of the first plurality of atomic nodes.

Example 28 may include the apparatus of Example 25, wherein the first configuration information includes a class identifier and one or more parameters associated with each atomic node, and wherein the class identifier includes one or more of a source node class, a sink node class or an operator node class.

Example 29 may include the apparatus of Example 25, further including means for binding one or more local abstracted resources to a subset of the first plurality of atomic nodes.

Example 30 may include the apparatus of any one of Examples 25 to 29, further including means for receiving, at the local device, second configuration information associated with a second plurality of atomic nodes corresponding to a second application, means for receiving, at the local device, an instruction to conduct a second runtime generation of only a subset of the second plurality of atomic nodes, means for binding one or more local abstracted resources to the subset of the second plurality of atomic nodes, and means for conducting the second runtime generation.

Thus, techniques described herein may provide a solution in which every IOT device may function both as master and slave on a per application basis. If an application is deployed through a certain device, then the device may act as the master, coordinating resources across multiple devices for the particular application. Additionally, every device may maintain a local copy of configuration information of an application. If a master device for a particular application is out of duty (e.g., low battery, disconnected, etc.), slave devices may assume the master role and redeploy the application. The configuration information may be the minimal set of settings that enable generation of runtime code. Moreover, the connectivity framework may support asset/resource abstraction. Protocol adaptation middleware (e.g., OIC, UPAL, etc.) may render resources easily discoverable by any devices in the IOT architecture. Distributed runtime code may also reduce the memory footprint and optimize bandwidth.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/ or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A local device comprising:
   a display to present a frontend interface; and
   a coordinator apparatus including,
   a request handler to receive, via the frontend interface, a request to deploy a first application,
   a code partitioner to partition the first application into a first plurality of atomic nodes, wherein the first plurality of atomic nodes are heterogeneous, and
   a distribution manager to send, at runtime, first configuration information for the first plurality of atomic nodes to a plurality of remote devices having abstracted resources that support operation of the first plurality of atomic nodes, wherein the abstracted resources are described to exclude device identifiers until runtime, wherein one of the first plurality of atomic nodes is designated as a master node for the first application and designated solely as a slave node for a different second application.

2. The local device of claim 1, wherein the first configuration information is to be sent via a device independent message protocol having a universal namespace.

3. The local device of claim 1, wherein the distribution manager is to instruct each of the plurality of remote devices to conduct a runtime generation of only a subset of the first plurality of atomic nodes.

4. The local device of claim 1, wherein the first configuration information is to include a class identifier and one or more parameters associated with each atomic node, and wherein the class identifier includes one or more of a source node class, a sink node class or an operator node class.

5. The local device of claim 1, further including:
   one or more local abstracted resources; and
   a local resource manager to bind the one or more local abstracted resources to a subset of the first plurality of atomic nodes.

6. The local device of claim 1, wherein the request handler is to receive, at the local device, second configuration information associated with a second plurality of atomic nodes corresponding to a second application and an instruction to conduct a second runtime generation of only a subset of the second plurality of atomic nodes, and wherein the coordinator apparatus further includes:
   a local resource manager to bind one or more local abstracted resources to the subset of the second plurality of atomic nodes; and
   a code generator to conduct the second runtime generation.

7. An apparatus comprising:
   a request handler to receive, at a local device, a request to deploy a first application;
   a code partitioner to partition the first application into a first plurality of atomic nodes, wherein the first plurality of atomic nodes are heterogeneous; and
   a distribution manager to send, at runtime, first configuration information for the first plurality of atomic nodes to a plurality of remote devices having abstracted resources that support operation of the first plurality of atomic nodes, wherein the abstracted resources are described to exclude device identifiers until runtime, wherein one of the first plurality of atomic nodes is designated as a master node for the first application and designated solely as a slave node for a different second application.

8. The apparatus of claim 7, wherein the first configuration information is to be sent via a device independent message protocol having a universal namespace.

9. The apparatus of claim 7, wherein the distribution manager is to instruct each of the plurality of remote devices to conduct a runtime generation of only a subset of the first plurality of atomic nodes.

10. The apparatus of claim 7, wherein the first configuration information is to include a class identifier and one or more parameters associated with each atomic node, and wherein the class identifier includes one or more of a source node class, a sink node class or an operator node class.

11. The apparatus of claim 7, further including:
    one or more local abstracted resources; and
    a local resource manager to bind the one or more local abstracted resources to a subset of the first plurality of atomic nodes.

12. The apparatus of claim 7, wherein the request handler is to receive, at the local device, second configuration information associated with a second plurality of atomic nodes corresponding to a second application and an instruction to conduct a second runtime generation of only a subset of the second plurality of atomic nodes, and wherein the apparatus further includes:
    a local resource manager to bind one or more local abstracted resources to the subset of the second plurality of atomic nodes; and
    a code generator to conduct the second runtime generation.

13. A method comprising:
    receiving, at a local device, a request to deploy a first application;
    partitioning the first application into a first plurality of atomic nodes, wherein the first plurality of atomic nodes are heterogeneous; and
    sending, at runtime, first configuration information for the first plurality of atomic nodes to a plurality of remote devices having abstracted resources that support operation of the first plurality of atomic nodes, wherein the abstracted resources are described to exclude device identifiers until runtime, wherein one of the first plurality of atomic nodes is designated as a master node for the first application and designated solely as a slave node for a different second application.

14. The method of claim 13, wherein the first configuration information is sent via a device independent message protocol having a universal namespace.

15. The method of claim 13, further including instructing each of the plurality of remote devices to conduct a runtime generation of only a subset of the first plurality of atomic nodes.

16. The method of claim 13, wherein the first configuration information includes a class identifier and one or more parameters associated with each atomic node, and wherein the class identifier includes one or more of a source node class, a sink node class or an operator node class.

17. The method of claim 13, further including binding one or more local abstracted resources to a subset of the first plurality of atomic nodes.

18. The method of claim 13, further including:
    receiving, at the local device, second configuration information associated with a second plurality of atomic nodes corresponding to a second application;
    receiving, at the local device, an instruction to conduct a second runtime generation of only a subset of the second plurality of atomic nodes;
    binding one or more local abstracted resources to the subset of the second plurality of atomic nodes; and
    conducting the second runtime generation.

19. At least one non-transitory computer readable storage medium comprising a set of instructions, which when executed by a local device, cause the local device to:
- receive, at the local device, a request to deploy a first application;
- partition the first application into a first plurality of atomic nodes, wherein the first plurality of atomic nodes are heterogeneous; and
- send, at runtime, first configuration information for the first plurality of atomic nodes to a plurality of remote devices having abstracted resources that support operation of the first plurality of atomic nodes, wherein the abstracted resources are described to exclude device identifiers until runtime, wherein one of the first plurality of atomic nodes is designated as a master node for the first application and designated solely as a slave node for a different second application.

20. The at least one non-transitory computer readable storage medium of claim 19, wherein the first configuration information is to be sent via a device independent message protocol having a universal namespace.

21. The at least one non-transitory computer readable storage medium of claim 19, wherein the instructions, when executed, cause the local device to instruct each of the plurality of remote devices to conduct a runtime generation of only a subset of the first plurality of atomic nodes.

22. The at least one non-transitory computer readable storage medium of claim 19, wherein the first configuration information is to include a class identifier and one or more parameters associated with each atomic node, and wherein the class identifier includes one or more of a source node class, a sink node class or an operator node class.

23. The at least one non-transitory computer readable storage medium of claim 19, wherein the instructions, when executed, cause the local device to bind one or more local abstracted resources to a subset of the first plurality of atomic nodes.

24. The at least one non-transitory computer readable storage medium of claim 19, wherein the instructions, when executed, cause the local device to:
- receive, at the local device, second configuration information associated with a second plurality of atomic nodes corresponding to a second application;
- receive, at the local device, an instruction to conduct a second runtime generation of only a subset of the second plurality of atomic nodes;
- bind one or more local abstracted resources to the subset of the second plurality of atomic nodes; and
- conduct the second runtime generation.

* * * * *